(12) United States Patent
Murata et al.

(10) Patent No.: US 6,531,549 B2
(45) Date of Patent: Mar. 11, 2003

(54) CRYSTALLIZED EPOXY RESINS, THEIR PRODUCTION METHOD, AND CURABLE COMPOSITIONS COMPRISING THEM

(75) Inventors: Yasuyuki Murata, Yokkaichi (JP); Masayuki Tsutsumi, Yokkaichi (JP); Kiyotaka Ikebata, Yokkaichi (JP); Ken Tanaka, Yokkaichi (JP)

(73) Assignee: Japan Epoxy Resins Co., Ltd., Tokyo (JP)

( * ) Notice: Subject to any disclaimer, the term of this patent is extended or adjusted under 35 U.S.C. 154(b) by 0 days.

(21) Appl. No.: 10/012,323

(22) Filed: Dec. 12, 2001

(65) Prior Publication Data

US 2002/0123602 A1 Sep. 5, 2002

(30) Foreign Application Priority Data

Dec. 28, 2000 (JP) ........................................ 2000-400013

(51) Int. Cl.⁷ ............................................... C08L 63/02
(52) U.S. Cl. ........................... 525/523; 528/89; 528/94; 549/517; 549/520; 549/541
(58) Field of Search ................................. 549/517, 520, 549/541; 528/89, 94; 525/523

(56) References Cited

U.S. PATENT DOCUMENTS 4,072,656 A 2/1978 Hartmaun

FOREIGN PATENT DOCUMENTS

| JP | 58-39677 | 3/1983 |
| JP | 60-67475 | 4/1985 |
| JP | 61-98726 | 5/1986 |

*Primary Examiner*—Margaret G. Moore
*Assistant Examiner*—D. Aylward
(74) *Attorney, Agent, or Firm*—Oblon, Spivak, McClelland, Maier & Neustadt, P.C.

(57) ABSTRACT

A crystallized epoxy resin which is easy to blend with a hardener or the like is a crystallized product of an epoxy resin derived from 4,4'-dihydroxy-3,3',5,5'-tetramethylbiphenyl and an epihalohydrin, and the ratio of an endotherm between 50° C. and 130° C. to an endotherm between 80° C. and 125° C., measured by raising the temperature at a rate of 10° C. per minute using a DSC device, is 1.03 or more.

6 Claims, 4 Drawing Sheets

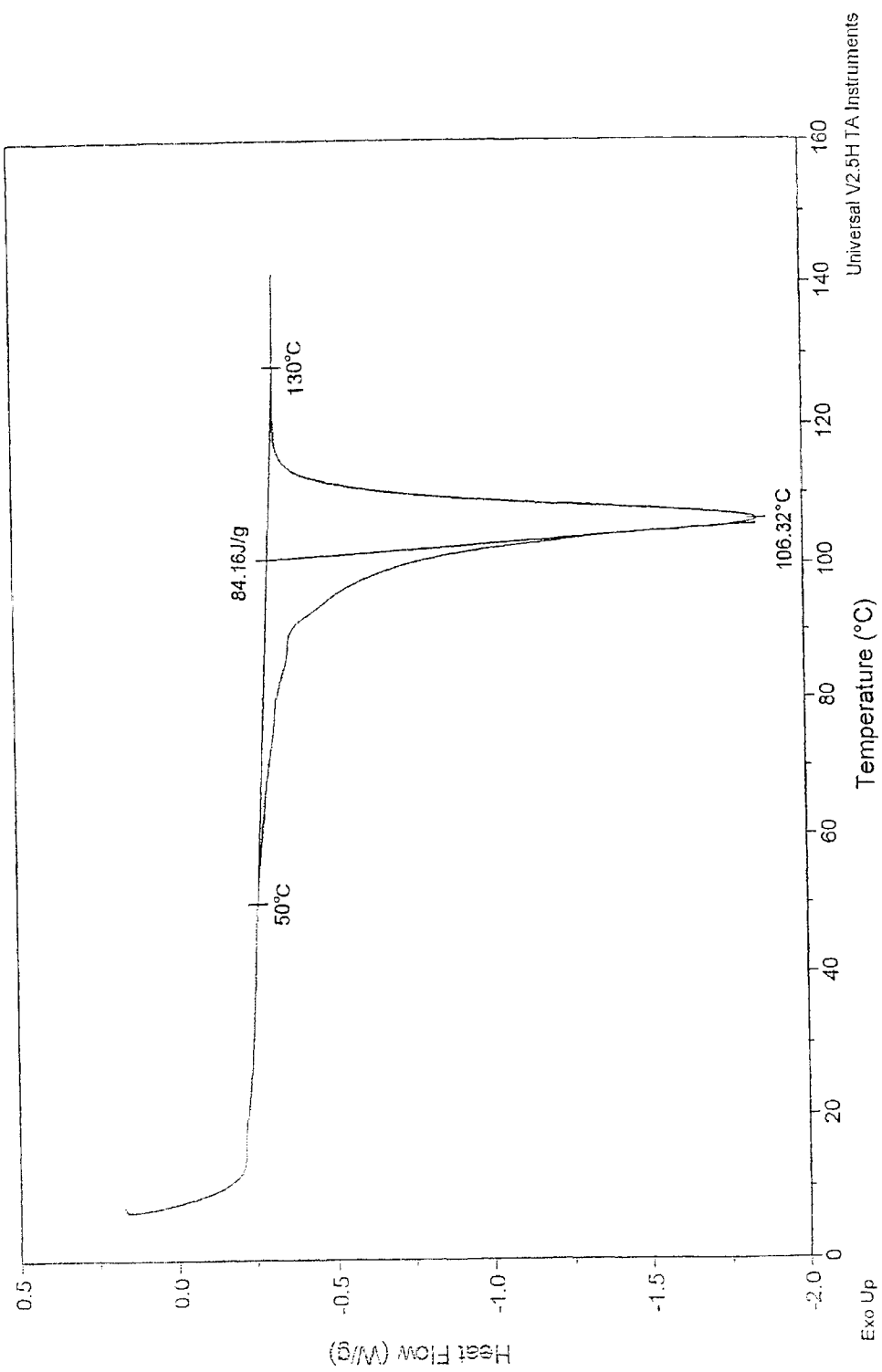
Fig. 1 DSC Chart for Example 1

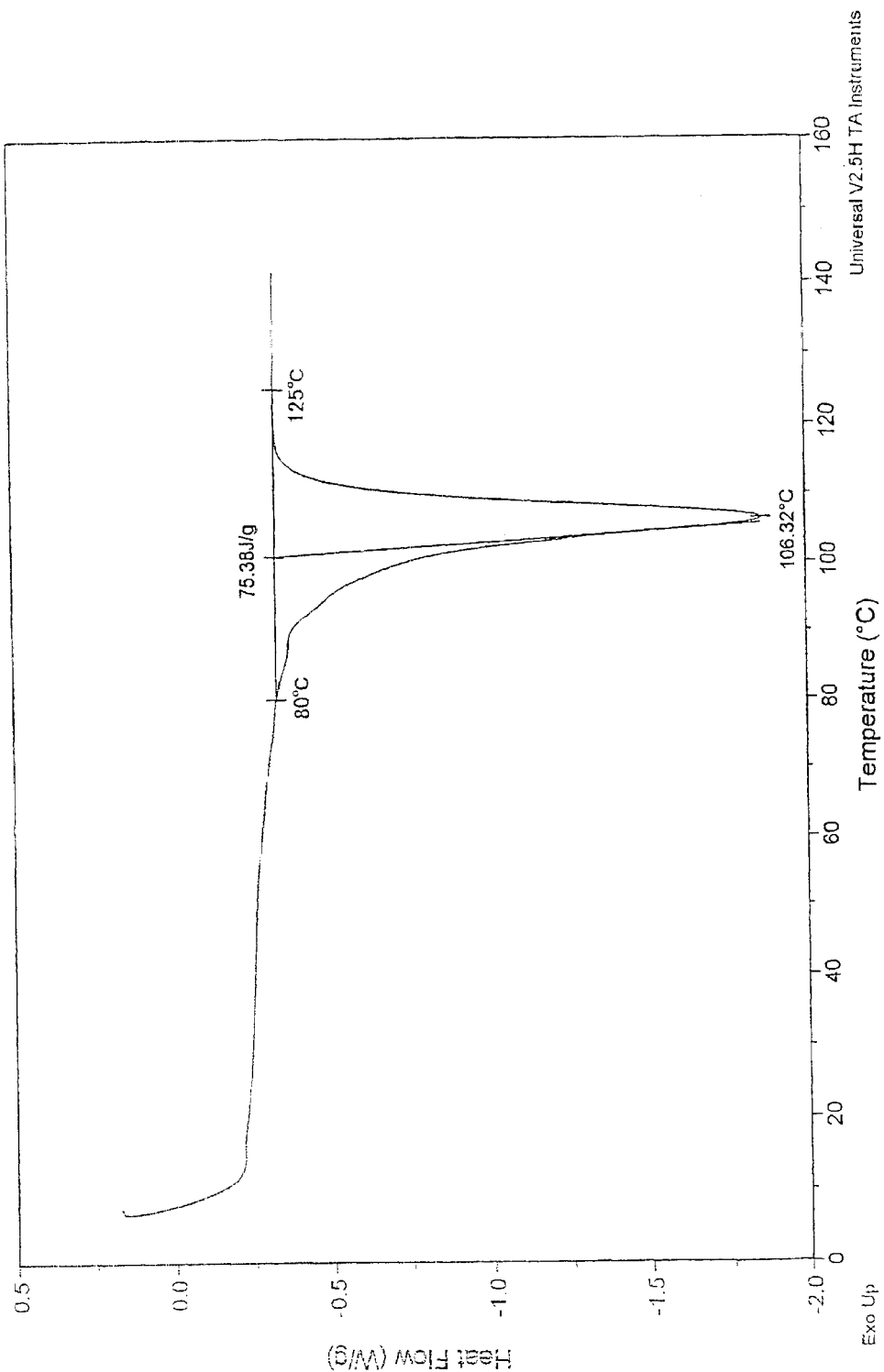
Fig 2 DSC Chart for Examle 1
Endotherm between 80°C and 125°C

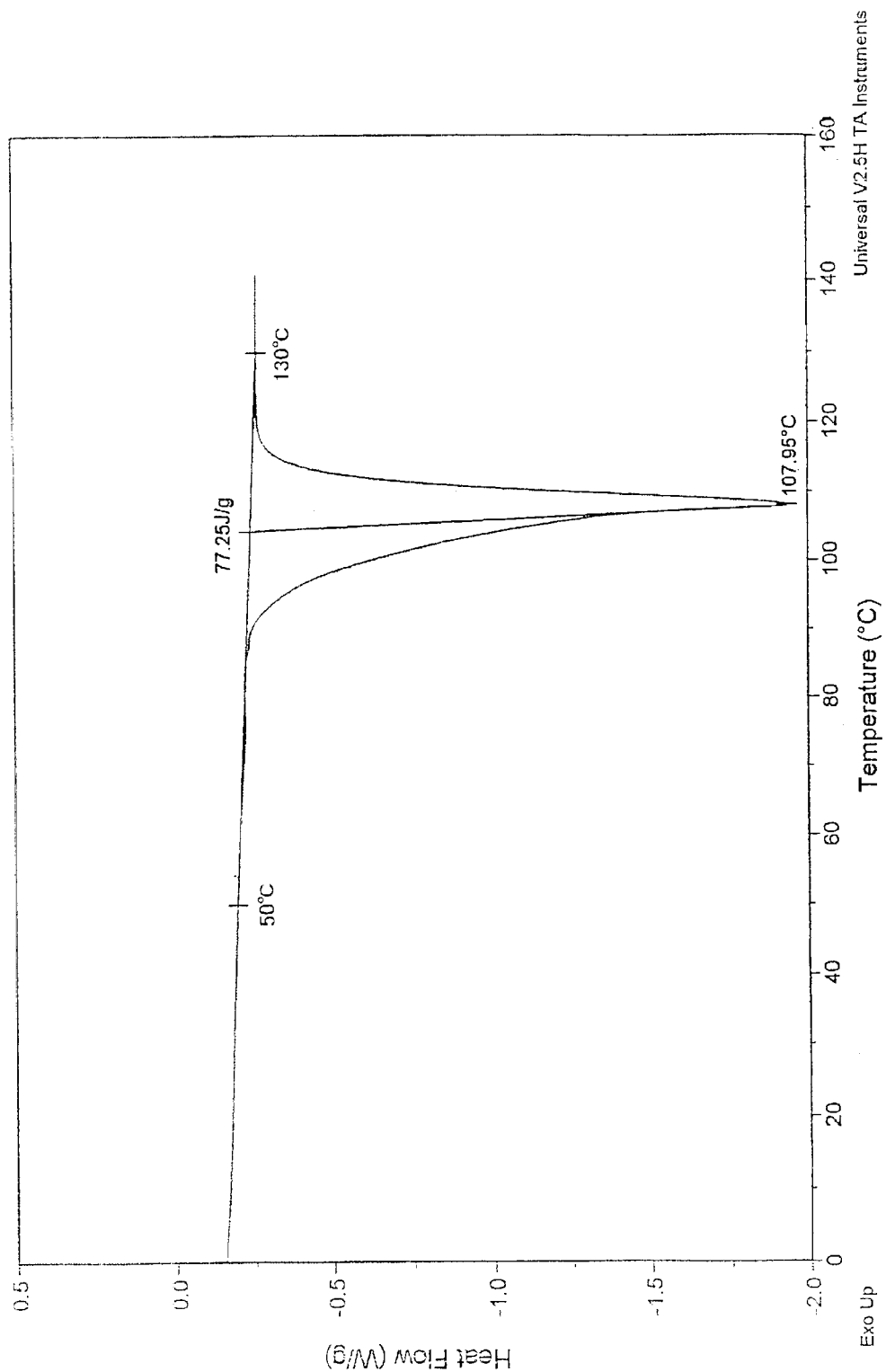
Fig.3 DSC Chart for Comparative Example 1

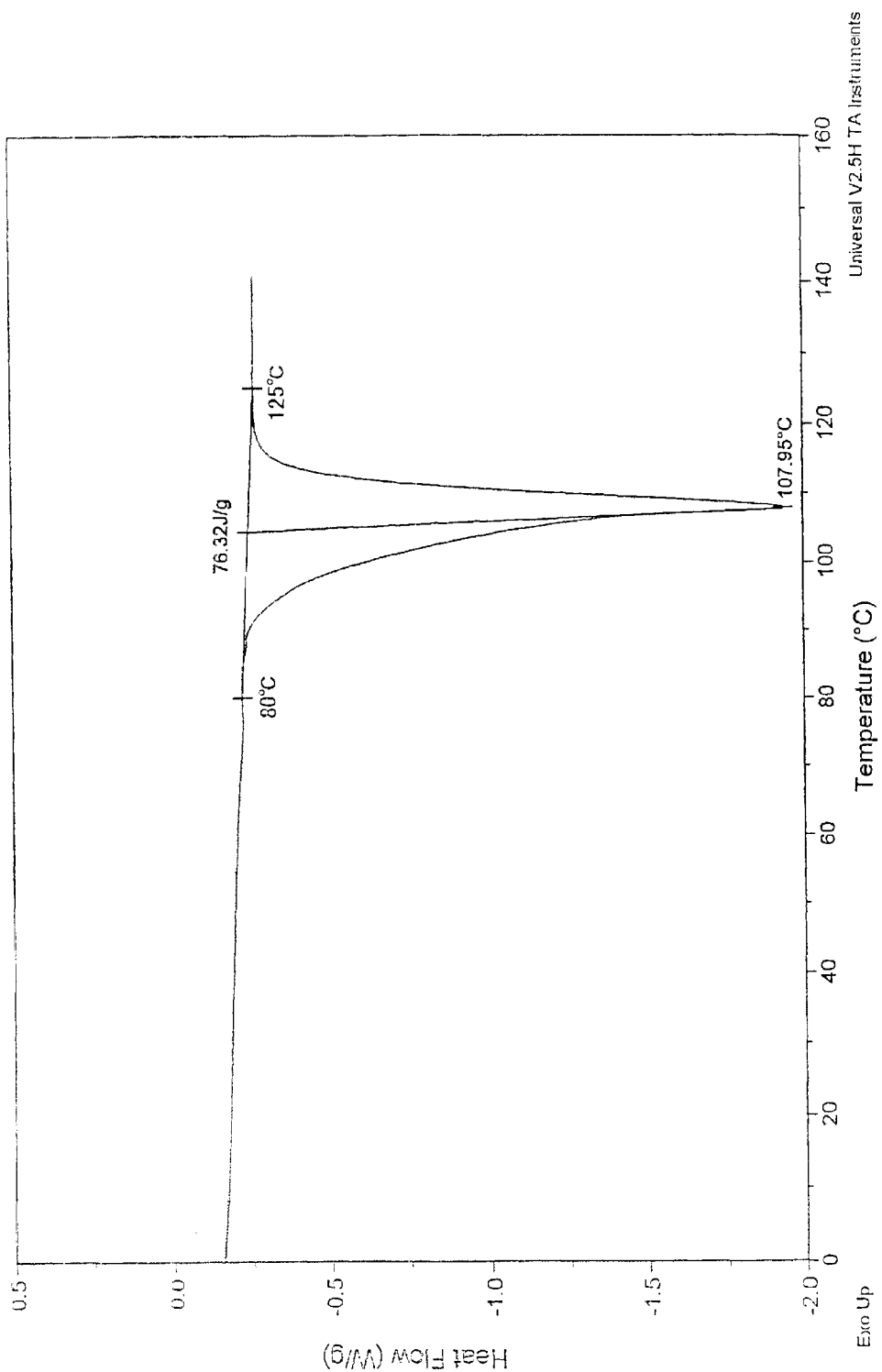
Fig.4 DSC Chart for Comparative Example 1
Endotherm between 80°C and 125°C

CRYSTALLIZED EPOXY RESINS, THEIR PRODUCTION METHOD, AND CURABLE COMPOSITIONS COMPRISING THEM

TECHNICAL FIELD OF THE INVENTION

The present invention relates to a crystallized tetramethylbiphenyl type epoxy resin which is easy to blend with a hardener or the like, a method for producing the crystallized epoxy resin, and a curable epoxy resin composition excellent in various properties comprising the crystallized epoxy resin.

PRIOR ART

Epoxy resins are used in wide fields such as adhesion, casting, encapsulation, lamination, molding and coating because of their excellent curing and easy-handling properties.

In general, epoxy resins are used by being mixed (blended) with various additives, including a hardener, being molded into a curable epoxy resin composition, and being cured. However, if each component is not uniformly mixed upon blending, such phenomena may occur that a curing reaction does not proceed sufficiently, and that a cured product becomes heterogeneous, and its performance cannot sufficiently be attained.

Because tetramethylbiphenyl type epoxy resins obtained by the reaction of 4,4'-dihydroxy-3,3',5,5'-tetramethylbiphenyl with an epihalohydrin are crystals having a melting point of from 100° C. to 120° C., they are widely used in applications, such as powder coating and semiconductor encapsulation, wherein they are solids at ordinary temperature and melted by raising the temperature to fluidize upon molding and/or curing. However, since they are crystals, there are such defects that their compatibilization with a hardener or the like is slow and poor mixing tends to occur. If the temperature upon blending is higher than the melting point, so as to uniformly mix, the reaction with a hardener proceeds at that time and poor fluidization tends to occur upon molding. Further, if a mixing time is prolonged, productivity decreases, which is industrially disadvantageous.

SUMMARY OF THE INVENTION

The present invention relates to a crystallized tetramethylbiphenyl type epoxy resin which is easy to blend with a hardener or the like, a method for producing the crystallized epoxy resin, and a curable epoxy resin composition excellent in various properties comprising the crystallized epoxy resin.

As a result of various investigations to solve the above-mentioned problems, the present inventors have found that a crystal of tetramethylbiphenyl type epoxy resin having a specific melting endothermic pattern quickly compatibilizes with a hardener or the like, whereby a uniform curable epoxy resin composition is easily obtained, and that a certain crystallized tetramethylbiphenyl type epoxy resin quickly compatibilizing can be obtained under specific crystallizing conditions, and have completed the present invention.

The present invention includes each of the following inventions.

(1) A crystallized epoxy resin, which is a crystallized product of an epoxy resin derived from 4,4'-dihydroxy-3,3', 5,5'-tetramethylbiphenyl and an epihalohydrin, wherein the ratio of an endotherm (the amount of heat absorbed) between 50° C. and 130° C. to an endotherm between 80° C. and 125° C., measured by raising the temperature at a rate of 10° C. per minute using a DSC device, is 1.03 or more.

(2) The crystallized epoxy resin as described in (1), wherein the ratio of an endotherm between 50° C. and 130° C. to an endotherm between 80° C. and 125° C., measured by raising the temperature at a rate of 10° C. per minute using a DSC device, is between 1.05 and 1.50, and the endothermic peak temperature is 110° C. or lower.

(3) A method for producing a crystallized epoxy resin having a ratio of an endotherm between 50° C. and 130° C. to an endotherm between 80° C. and 125° C. of 1.03 or more, measured by raising the temperature at a rate of 10° C. per minute using a DSC device, comprising cooling an epoxy resin derived from 4,4'-dihydroxy-3,3',5,5'-tetramethyl-biphenyl and an epihalohydrin and having an epoxy equivalent of 180 to 210, from the molten state at 105° C. or higher, and nearly completely crystallizing within 2 hours after the temperature reaches lower than 105° C.

(4) The method for producing a crystallized epoxy resin as described in (3), wherein the ratio of an endotherm between 50° C. and 130° C. to an endotherm between 80° C. and 125° C., measured by raising the temperature at a rate of 10° C. per minute using a DSC device, is between 1.05 and 1.50, and the endothermic peak temperature is 110° C. or lower.

(5) The method for producing a crystallized epoxy resin as described in (3) or (4), wherein the step of cooling from the molten state at 105° C. or higher and nearly completely crystallizing the epoxy resin within 2 hours after the temperature reaches lower than 105° C., comprises adding a crystal nucleus and/or applying a shear force.

(6) A curable epoxy resin composition comprising a blend of a crystallized epoxy resin derived from 4,4'-dihydroxy-3,3',5,5'-tetramethylbiphenyl and an epihalohydrin and having a ratio of an endotherm between 50' C. and 130° C. to an endotherm between 80° C. and 125° C. of 1.03 or more, measured by raising the temperature at a rate of 10° C. per minute using a DSC device, and a hardener for epoxy resins, as essential components.

(7) The curable epoxy resin composition as described in (6), wherein the crystallized epoxy resin has a ratio of an endotherm between 50° C. and 130° C. to an endotherm between 80° C. and 125° C., measured by raising the temperature at a rate of 10° C. per minute using a DSC device, of between 1.05 and 1.50, and an endothermic peak temperature of 110° C. or lower.

BRIEF DESCRIPTION OF THE DRAWINGS

The present invention will be described in detail with reference to the drawings in which:

FIG. 1 is a graph showing a measurement example of an endotherm between 50° C. and 130° C. of the crystallized epoxy resin of Example FIG. 2 is a graph showing a measurement example of an endotherm between 80° C. and 125° C. of the crystallized epoxy resin of Example 1;

FIG. 3 is a graph showing a measurement example of an endotherm between 50° C. and 130° C. of the crystallized epoxy resin of Comparative Example 1; and FIG. 4 is a graph showing a measurement example of an endotherm between 80° C. and 125° C. of the crystallized epoxy resin of Comparative Example 1.

DESCRIPTION OF PREFERRED EMBODIMENTS

The crystallized epoxy resin of the present invention is a crystallized product of an epoxy resin derived from 4,4'- dihydroxy-3,3', 5,5'-tetramethylbiphenyl and an epihalohydrin, and its melting endothermic pattern is such that the ratio of an endotherm between 50° C. and 130° C. to an endotherm between 80° C. and 125° C., measured by raising the temperature at a rate of 10° C. per minute using a DSC device, is 1.03 or more, preferably between 1.05 and 1.50, more preferably between 1.06 and 1.40, and the endothermic peak temperature is preferably 110° C. or lower, more preferably 109° C. or lower.

The endotherm between 50° C. and 130° C. is obtained by raising the temperature of 5 to 20 mg of a crystal powder at a rate of 10° C. per minute using a DSC device (differential scanning calorimeter), linking the points at 50° C. and 130° C. on the obtained DSC curve with a straight line, and calculating an area of the portion surrounded by the straight line and the DSC curve. The endotherm between 80° C. and 125° C. is determined in the same manner. The endothermic peak temperature is a temperature at the top of the endothermic peak on the DSC curve.

If the ratio of the endotherm between 50° C. and 130° C. to the endotherm between 80° C. and 125° C. is too small, compatibilization with a hardener or the like becomes slow, and the advantageous effect of the present invention is not fully attained. Crystals having too large ratio of the endotherm are not completely crystallized, making it difficult to handle as a solid. Crystals having too high an endothermic peak temperature are slow in compatibilization with a hardener or the like.

The method for producing the crystallized epoxy resin of the present invention is not particularly limited so long as a product having a specified ratio of the endotherm can be obtained. However, even if the same tetramethylbiphenyl type epoxy resin is used, the crystallized state varies depending on the crystallization conditions. Therefore, it is preferable to use the method for producing the crystallized epoxy resin of the present invention in which the crystallization conditions are specified.

The tetramethylbiphenyl type epoxy resin used in the method for producing the crystallized epoxy resin of the present invention is an epoxy resin derived from 4,4'-dihydroxy-3,3',5,5'-tetramethylbiphenyl and an epihalohydrin, and its production method and properties are not particularly limited. It is however necessary that the epoxy equivalent is 180 to 210, preferably 181 to 200. If the epoxy equivalent is too low, it is difficult to obtain crystals having the specified ratio of the endotherm even with the method for producing the crystallized epoxy resin of the present invention. If the epoxy equivalent is too high, it is difficult to complete the crystallization within the specified period of time.

In the method for producing the crystallized epoxy resin of the present invention, the tetramethylbiphenyl type epoxy resin is placed in the molten state at 105° C. or higher. The resin is then cooled to a temperature lower than its melting point to crystallize the same. The resin is nearly completely crystallized within 2 hours, preferably 1 hour and 30 minutes, more preferably 1 hour, after the resin temperature reaches a temperature lower than 105° C. Nearly complete crystallization means that the resin becomes the state in which it can be handled as a solid. The advantageous effect of the present invention becomes more remarkable as the crystallization time becomes shorter. If the crystallization time is too long, the crystallized epoxy resin of the present invention is not obtained.

There are various methods to shorten the crystallization time. Although not particularly limited, addition of crystal nuclei separately provided, and application of shear force to the resin by stirring or kneading are preferred in that crystallization can be achieved within a short period of time by a simple operation.

The preferable temperature at the time of crystallization varies depending on other conditions, but is generally 10–90° C., preferably 20–80° C.

The curable epoxy resin composition of the present invention comprises a blend of the crystallized epoxy resin of the present invention and a hardener for epoxy resin as the essential components.

Epoxy resins other than the crystallized epoxy resin of the present invention can also be compounded in the curable epoxy resin composition of the present invention. The epoxy resins that can be used together are not particularly specified, and any epoxy resin can be used so long as it is an epoxy resin other than the crystallized epoxy resin of the present invention.

Examples of such an epoxy resin include epoxy resins produced from various phenol compounds, such as various phenols, e.g., bisphenol A, bisphenol F, bisphenol AD, tetrabutylbisphenol A, hydroquinone, methylhydroquinone, dimethylhydroquinone, dibutylhydroquinone, resorcin, methylresorcin, biphenol, dihydroxynaphthalene, dihydroxydiphenyl ether, dihydroxystilbenes, phenol novolak resin, cresol novolak resin, bisphenol A novolak resin, dicyclopentadiene phenolic resin, phenol aralkyl resin, naphthol novolak resin, terpene phenolic resin, heavy oil-modified phenolic resin or brominated phenol novolak resin, and polyhydric phenolic resins obtained by condensation reaction of various phenols with various aldehydes, e.g., hydroxybenzaldehyde, crotonaldehyde or glyoxal, and an epihalohydrin; epoxy resins produced from various amine compounds, such as diaminodiphenylmethane, aminophenol and xylenediamine, and an epihalohydrin; and epoxy resins produced from various carboxylic acids, such as methylhexahydrophthalic acid and dimer acid, and an epihalohydrin.

The proportion of the crystallized epoxy resin of the present invention used in the curable epoxy resin composition of the present invention is 10–100% by weight, preferably 20–100% by weight, based on the total epoxy resin components. If the proportion of the high performance epoxy resin of the present invention is small, excellent characteristics of the tetramethylbiphenyl type epoxy resin are not exhibited.

A hardener for epoxy resin is compounded as the essential component with the curable epoxy resin composition of the present invention. The hardener for epoxy resin is not particularly specified, and any hardener can be used so long as it is a hardener for an epoxy resin.

Examples of the hardener that can be used include various polyhydric phenols, such as bisphenol A, bisphenol F, bisphenol AD, tetrabutylbisphenol A, hydroquinone, resorcin, methylresorcin, biphenol, tetramethylbiphenol, dihydroxynaphthalene, dihydroxydiphenylether, phenolnovolakresin, cresolnovolakresin, bisphenol A novolak resin, dicyclopentadiene phenolic resin, terpene phenolic resin, naphthol novolak resin, heavy oil—modified phenolic resin, and brominated phenol novolak resin; various phenol resins, such as polyhydric phenolic resins obtained by condensation reaction of various phenols with various aldehydes, e.g., hydroxybenzaldehyde, crotonaldehyde or glyoxal; acid anhydrides, such as methyltetrahydrophthalic anhydride, hexahydrophthalic anhydride, pyromellitic anhydride, and methylnadic acid; and amines, such as diethylene triamine, isophorone diamine, diaminodiphenyl methane, diaminodiphenyl sulfone, and dicyandiamide.

Examples of the hardener of the type that initiates polymerization of epoxy groups include phosphine compounds, such as triphenyl phosphine, phosphonium salts, such as tetraphenylphosphonium tetraphenylborate, imidazoles, such as 2-methylimidazole, 2-phenylimidazole, 2-ethyl-4-methylimidazole, 2-undecylimidazole, 1-cyanoethyl-2-methylimidazole, and 2,4-dicyano-6-[2-methylimidazolyl-(1)]-ethyl-S-triazine, imidazolium salts, such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, amines, such as 2,4,6-tris(dimethylaminomethyl)phenol and benzyldimethylamine, ammonium salts, such as triethylammonium tetraphenylborate, diazabicyclo compounds, such as 1,5-diazabicyclo(5,4,0)-7-undecene and 1,5-diazabicyclo(4,3,0)-5-nonene, and tetraphenylborates, phenol salts, phenol novolak salts and 2-ethylhexanoates of those diazabicyclo compounds.

Further, triflic acid salts, boron trifluoride ether complex compounds, metal fluoroboron complex salts, bis (perfluoroalkylsulfonyl)methane metal salts, aryl diazoniumm compounds, aromatic onium salts, dicarbonyl chelates of Groups IIIa-Va elements, thiopyrylium salts, VIb elements in the form of MF6_ anion wherein M is selected from phosphorus, antimony and arsenic, arylsulfonium complex salts, aromatic iodonium complex salts, aromatic sulfonium complex salts, bis[4-(diphenylsulfonio)phenyl]sulfide-bis-hexafluoro metal salts, for example, phosphates, arsenates, antimonates or the like, aryl sulfonium complex salts and aromatic sulfonium or iodonium salts of halogen-containing complex ions can be used. Those hardeners for epoxy resin may be used alone or as mixtures of two kinds or more thereof.

The proportion of the hardener used in the curable epoxy resin composition of the present invention is preferably such an amount that the sum of groups that react with epoxy groups in the entire hardener components is 0.5–2.0 moles, more preferably 0.7–1.5 moles, per mole of the epoxy groups in the entire epoxy resin components, in the case of using compounds having groups that react with epoxy groups.

In the case of using the hardener of the type that initiates polymerization of epoxy groups as the hardener component, the amount thereof is preferably 0.1–10 parts by weight, more preferably 0.3–5 parts by weight, per 100 parts by weight of the entire epoxy resin components.

If necessary, inorganic fillers, reinforcing fibers, cure accelerators, coupling agents, plasticizers, pigments, solvents, flame retardants or the like can appropriately be blended in the curable epoxy resin composition of the present invention.

Examples of the inorganic filler include, for example, fused silica, crystalline silica, glass powder, alumina and calcium carbonate. The shape thereof is a crushed form or a spherical form. Various inorganic fillers are used alone or as mixtures of two kinds or more thereof. The amount of the inorganic filler used is 30–95% by weight, preferably 50–95% by weight, more preferably 70–93% by weight, based on the entire composition.

Further, the cure accelerator is a compound which promotes the reaction between epoxy groups in the epoxy resin and active groups in the hardener.

Examples of the cure accelerator include phosphine compounds, such as tributyl phosphine, triphenyl phosphine, tris (dimethoxyphenyl) phosphine, tris (hydroxypropyl) phosphine and tris (cyanoethyl)phosphine; phosphonium salts, such as tetraphenyl-phosphonium tetraphenylborate, methyltributylphosphonium tetraphenylborate and methyltricyanoethylphosphonium tetraphenylborate; imidazoles, such as 2-methylimidazole, 2-phenyl-imidazole, 2-ethyl-4-methylimidazole, 2-undecylimidazole, 1-cyanoethyl-2-methylimidazole, 2,4-dicyano-6-[2-methylimidazolyl-(1)]-ethyl-S-triazine and 2,4-dicyano-6-[2-undecylimidazolyl-(1)]-ethyl-S-triazine; imidazolium salts, such as 1-cyanoethyl-2-undecylimidazolium trimellitate, 2-methylimidazolium isocyanurate, 2-ethyl-4-methylimidazolium tetraphenylborate and 2-ethyl-1,4-dimethylimidazolium tetraphenylborate; amines, such as 2,4,6-tris(dimethylaminomethyl)phenol, benzyldimethylamine, tetramethylbutylguanidine, N-methylpiperazine and 2-dimethylamino-1-pyrroline; ammonium salts, such as triethylammonium tetraphenylborate; diazabicyclo compounds, such as 1,5-diazabicyclo(5,4,0)-7-undecene, 1,5-diazabicyclo(4,3,0)-5-nonene and 1,4-diazabicyclo(2,2,2)octane; and tetraphenylborates, phenol salts, phenol novolak salts and 2-ethylhexanoic acid salts of those diazabicyclo compounds.

Of the compounds forming those cure accelerators, tertiary amines, phosphine compounds, imidazole compounds, diazabicyclo compounds, and their salts are preferred.

Those cure accelerators are used alone or as mixtures of two kinds or more thereof, and the amount thereof used is 0.1–7% by weight based on the entire epoxy resin components.

Examples of the flame retardant include halogen-containing flame retardants, such as brominated epoxy resin, antimony compounds, such as antimony trioxide, phosphorus-containing flame retardants, such as phosphoric esters and phosphines, nitrogen-containing flame retardants, such as melamine derivatives, and inorganic flame retardants, such as aluminum and magnesium hydroxides.

The crystallized epoxy resin of the present invention shows rapid compatibilization with a hardener or the like, so that blending is easy. The method for producing a crystallized epoxy resin of the present invention can easily produce the crystallized epoxy resin. Further, in the curable epoxy resin composition of the present invention, curing reaction occurs homogeneously, so that the composition has excellent curability and various curing properties.

EXAMPLES

The invention will be described in more detail by reference to a production example of tetramethylbiphenyl type epoxy resin, and examples and comparative examples of the crystallized epoxy resin, the method for producing the crystallized epoxy resin and the curable epoxy resin composition according to the present invention.

Production example of tetramethylbiphenyl type epoxy resin

To a 5 liters three-necked flask equipped with a thermometer, a stirring device and a cooling pipe, 363 g of 4,4'-dihydroxy-3,3',5,5'-tetramethylbiphenyl, 1665 g of epichlorohydrin and 600 g of 2-propanol were charged and the temperature was elevated to 50° C. to dissolve the contents. 273 g of 48.5 wt % aqueous sodium hydroxide solution was added dropwise over 1 hour. During the addition, the temperature was gradually elevated such that the contents in the system reached 70° C. at the time of completion of the addition. Thereafter, the contents were maintained at 70° C. for 30 minutes to conduct reaction. After completion of the reaction, the reaction mixture was washed with water to remove by-product salts and excess sodium hydroxide. Excess epichlorohydrin and 2-propanol were distilled off from the reaction product under reduced pressure to obtain a crude epoxy resin.

This crude epoxy resin was dissolved in 750 g of methyl isobutyl ketone, 6 g of 48.5 wt % aqueous sodium hydroxide solution was added thereto, and reaction was conducted at a temperature of 70° C. for 1 hour. After completion of the reaction, monosodium phosphate was added to neutralize excess sodium hydroxide, followed by washing with water to remove by-produced salts. Methyl isobutyl ketone was completely removed under reduced pressure while heating to obtain a desired epoxy resin. Epoxy resin at that time was in the molten state having a resin temperature of about 150° C.

Example 1

50 g of the tetramethylbiphenyl type epoxy resin in the molten state produced in the above production example was placed in a glass vessel, and was gradually cooled. When the resin temperature reached 70° C., 3 g of crystal powder of tetramethylbiphenyl type epoxy resin separately provided was added, followed by quick mixing. When the resulting mixture was allowed to stand for cooling, the mixture was nearly completely crystallized after 25 minutes from the time at which the resin temperature reached 105° C., and was in the state such that it could be handled as a solid.

Epoxy equivalent; endotherm between 50° C. and 130° C., endotherm between 80° C. and 125° C., and their ratio; and endothermic peak temperature of this crystallized epoxy resin are shown in Table 1.

Measurement of DSC data was conducted with a sample amount of about 10 mg and at a temperature rising rate of 10° C. per minute using MDSC2920 model device, a product of TA Instrument Co. Calculation of the endotherm was conducted automatically by a computer (see DSC charts of FIG. 1 and FIG. 2).

Example 2:

50 g of the tetramethylbiphenyl type epoxy resin in the molten state produced in the above Production Example was placed in a glass vessel, and gradually cooled. When the resin temperature reached 70° C., the resin was vigorously stirred with a glass rod for 5 minutes. Crystals begun to partially precipitate during stirring. When the resin was allowed to stand for cooling, the resin was nearly completely crystallized after 15 minutes from the time at which the resin temperature reached 105° C., and was in the state such that it could be handled as a solid.

Epoxy equivalent; endotherm between 50° C. and 130° C., endotherm between 80° C. and 125° C., and their ratio; and endothermic peak temperature of this crystallized epoxy resin are shown in Table 1.

Comparative Example 1

50 g of the tetramethylbiphenyl type epoxy resin in the molten state produced in the above Production Example was placed in a glass vessel, and was allowed to stand for cooling. Precipitation of crystals was very slow, and the resin was nearly completely crystallized after 3 hours from the time at which the resin temperature reached 105° C., and was in the state such that it could be handled as a solid.

Epoxy equivalent; endotherm between 50° C. and 130° C., endotherm between 80° C. and 125° C., and their ratio; and endothermic peak temperature of this crystallized epoxy resin are shown in Table 1 (see DSC charts of FIG. 3 and FIG. 4).

Comparative Example 2

50 g of the tetramethylbiphenyl type epoxy resin in the molten state produced in the above Production Example was placed in a glass vessel, and was dissolved in 50 g of methyl isobutyl ketone at about 100° C. The resulting solution was gradually cooled and maintained at about 20° C. for about 5 hours. After filtering off needle-like crystals precipitated, the crystals were dried in vacuum at 50° C. for about 5 hours to remove methyl isobutyl ketone, thereby obtaining a crystallized epoxy resin.

Epoxy equivalent; endotherm between 50° C. and 130° C., endotherm between 80° C. and 125° C., and their ratio; and endothermic peak temperature of this crystallized epoxy resin are shown in Table 1.

Examples 3 and 4, and Comparative Examples 3 and 4

As shown in Table 2, the crystallized epoxy resins produced in Examples 1 and 2 and Comparative Examples 1 and 2 were used as an epoxy resin component, a phenol aralkyl resin was used as a hardener component, fused silica powder was used as an inorganic filler, triphenylphosphine was used as a cure accelerator, and carnauba wax was used as a release agent.

Each component was then ground and those were mixed. The mixture was kneaded at 70° C. for 5 minutes using mixing rolls. Each mixture obtained was taken out in the form of a sheet. The sheet was ground to obtain the respective curable epoxy resin composition.

Gelation time of each curable epoxy resin composition was measured at 180° C. Each of those curable epoxy resin compositions was molded with a low pressure transfer molding machine at a mold temperature of 180° C. for a molding time of 90 seconds to obtain each test piece. Each test piece was then post-cured for 5 hours. Glass transition temperature and flexural strength at 23° C. of each test piece were measured, and the results are shown in Table 2.

The curable epoxy resin compositions produced in Examples 3 and 4 were excellent in curability, heat resistance and mechanical strength as compared with those produced in Comparative Examples 3 and 4.

TABLE 1

|  | Example 1 | Example 2 | Comparative Example 1 | Comparative Example 2 |
|---|---|---|---|---|
| Epoxy equivalent g/eq. | 186 | 186 | 186 | 178 |
| Endotherm (A) between 50° C. and 130° C. J/g | 84.2 | 79.7 | 77.3 | 87.7 |
| Endotherm (B) between 80° C. and 125° C. J/g | 75.4 | 67.8 | 76.3 | 87.3 |
| Ratio (A/B) | 1.12 | 1.18 | 1.01 | 1.00 |
| Endothermic peak temperature ° C. | 106.3 | 106.9 | 108.0 | 110.5 |

TABLE 2

| | Example 3 | Example 4 | Comparative Example 3 | Comparative Example 4 |
|---|---|---|---|---|
| Formulation of curable epoxy resin composition (parts by weight) Crystallized epoxy resin | Example 1 | Example 2 | Comparative Example 1 | Comparative Example 2 |
| Compounded Hardener for epoxy resin *1 | 100 | 100 | 100 | 100 |
| Compounded Inorganic filler *2 | 90 | 90 | 90 | 95 |
| | 770 | 770 | 770 | 788 |
| Triphenylphosphine | 1 | 1 | 1 | 1 |
| Carnauba wax | 1 | 1 | 1 | 1 |
| Curability Gelation time sec | 51 | 48 | 77 | 87 |
| Cured product properties Glass transition temperature *3 °C. | 125 | 127 | 111 | 115 |
| Flexural strength (23° C.) kg/mm² | 14.3 | 14.5 | 12.2 | 11.8 |

*1: Phenol aralkyl resin (trade name: MILEX XL-225-3L, a product of Mitsui Chemical Co., hydroxyl equivalent: 170)
*2: Fused silica powder (trade name: RD-8, a product of Tatsumori Co.)
*3: Determined from an inflection point on TMA curve The crystallized epoxy resin of the present invention can be quickly compatibilized with a hardener or the like, and therefore easily blended. Further, according to the method for producing a crystallized epoxy resin of the present invention, the crystallized epoxy resin can easily be produced. Furthermore, the curable epoxy resin composition of the present invention comprising the crystallized epoxy resin has excellent curability and also has various excellent cured product properties, because the curing reaction is uniform.

What is claimed is:

1. A crystallized epoxy resin, which is a crystallized product of an epoxy resin derived from 4,4'-dihydroxy-3,3',5,5'-tetramethylbiphenyl and an epihalohydrin, wherein the ratio of an endotherm between 50° C. and 130° C. to an endotherm between 80° C. and 125° C., measured by raising the temperature at a rate of 10° C. per minute using a DSC device, is 1.03 or more.

2. The crystallized epoxy resin as claimed in claim 1, wherein the ratio of an endotherm between 50° C. and 130° C. to an endotherm between 80° C. and 125+ C., measured by raising the temperature at a rate of 10° C. per minute using a DSC device, is between 1.05 and 1.50, and the endothermic peak temperature is 110° C. or lower.

3. A method for producing a crystallized epoxy resin having a ratio of an endotherm between 50° C. and 130° C. to an endotherm between 80° C. and 125° C., measured by raising the temperature at a rate of 10° C. per minute using a DSC device, of 1.03 or more, comprising cooling an epoxy resin derived from 4,4'-dihydroxy-3,3',5,5'-tetramethylbiphenyl and an epihalohydrin and having an epoxy equivalent of 180 to 210, from the molten state at 105° C. or higher, and nearly completely crystallizing within 2 hours after the temperature reaches lower than 105° C.

4. The method for producing a crystallized epoxy resin as claimed in claim 3, wherein the ratio of an endotherm between 50° C. and 130° C. to an endotherm between 80° C. and 125° C., measured by raising the temperature at a rate of 10° C. per minute using a DSC device, is between 1.05 and 1.50, and the endothermic peak temperature is 110° C. or lower.

5. The method for producing a crystallized epoxy resin as claimed in claim 3 or 4, wherein the step of cooling the epoxy resin from the molten state at 105° C. or higher and nearly completely crystallizing the epoxy resin within 2 hours after the temperature reaches lower than 105° C., comprises crystallizing by adding a crystal nucleus and/or applying a shear force at a temperature lower than 105° C.

6. A curable epoxy resin composition comprising a blend of the crystallized epoxy resin as claimed in claim 1 or 2, with a hardener for epoxy resin.

* * * * *